June 4, 1957

F. M. MORA 2,794,838

CONTINUOUS PROCESS FOR PRODUCING ACETONE USING
CALCIUM ACETATE LIQUOR AS
STARTING MATERIAL

Filed Aug. 12, 1952

INVENTOR
FERNANDO MARIO MORA

BY *Sian P. Tashof*

ATTORNEY

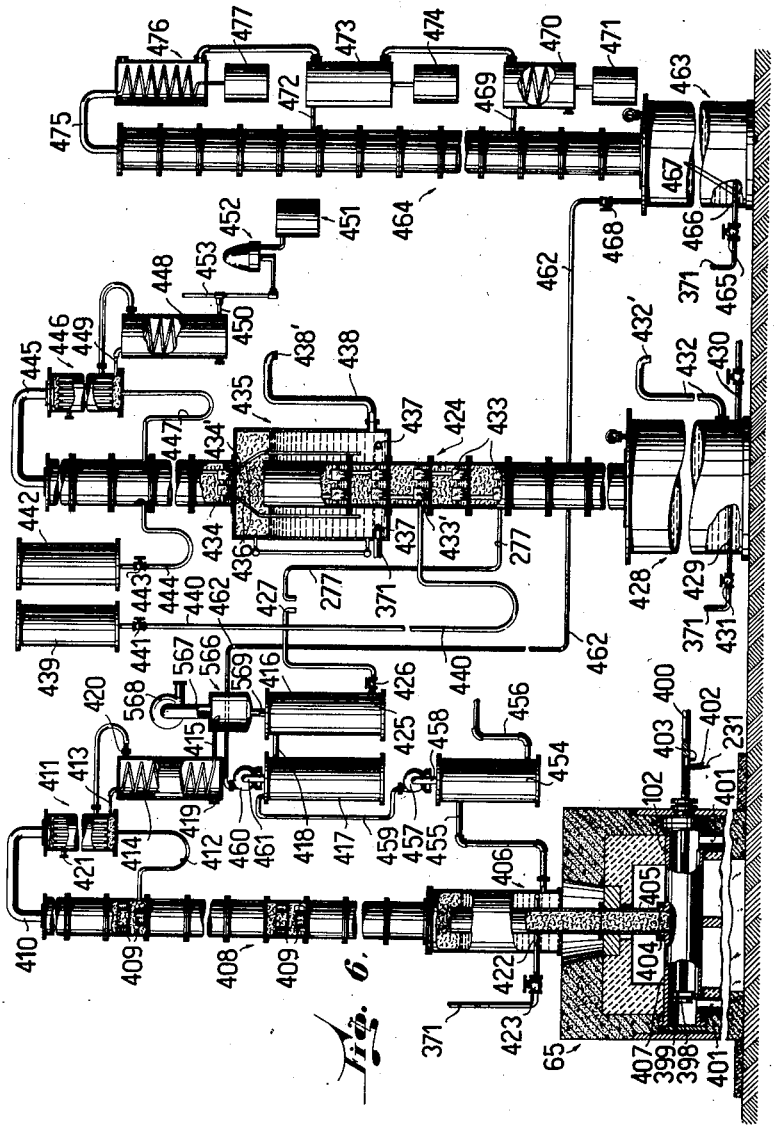

United States Patent Office 2,794,838
Patented June 4, 1957

2,794,838

CONTINUOUS PROCESS FOR PRODUCING ACETONE USING CALCIUM ACETATE LIQUOR AS STARTING MATERIAL

Fernando Mario Mora, Buenos Aires, Argentina

Application August 12, 1952, Serial No. 304,023

6 Claims. (Cl. 260—595)

The present invention relates to a novel method of treating calcium acetate liquor, such as the liquor obtained by treating pyroligneous acid with calcium hydrate and clarifying the resulting calcium acetate, to produce products such as acetone, methyl acetone and acetone oils.

In the known processes for decomposing calcium acetate, the above mentioned products are obtained from dry calcium acetate. Since the steps of the process for obtaining the above mentioned product are rather well known, it is considered unnecessary to enter into very specific details with regard to them. The main operations which are performed in the known process, are the following:

(a) Heating the calcium acetate liquor in large boilers in order to evaporate the water, until a pasty state is reached.

(b) Drying the paste until completely dried.

(c) Distilling the dry calcium acetate until it is decomposed.

The above three steps are of such an exorbitant cost for wood distilleries that in practice it is impossible to produce acetone starting from the pyroligneous acid, and therefore the distilleries prefer to send said pyroligneous acid or the calcium acetate liquor to waste before industrializing it, which obviously represents a deplorable loss.

In the known process of industrializing the dry calcium acetate, several important drawbacks occur, such as:

The evaporation of the water contained in the calcium acetate liquor by heating said calcium acetate in enormous boilers either by direct fire or by steam produces considerable heat insulating incrustations which imply serious inconveniences and considerable loss of fuel.

Once the pasty state is reached, it is necessary to extract the paste from the boiler and spray it over heated iron plates, where the drying operation is carried out, which requires the continuous presence of operators in order to remove the paste which sticks on the heated plates.

Once the drying operation is completed, the calcium acetate is stored for its further elaboration.

In other words, it must be shifted, cooled and thereafter filled into distilling autoclaves where the calcium acetate is reheated to approximately 300 to 400° C. for its decomposition.

Bearing in mind the time, the expense and the enormous loss of calories and, what is more, the maintenance of three apparatus without considering the building costs, it is definitely shown that for wood distilleries such an equipment is really uneconomic.

On the other hand the step of treating the pyroligneous acid and more particularly the calcium acetate liquor, according to the present invention, permits the acetone to be obtained in a single continuous step by spraying a thin coating of the liquor on successive internal surface areas heated to the decomposition temperature of the calcium acetate liquor.

An object of the present invention is the provision of a novel process for producing acetone directly from a calcium acetate liquor in a single continuous step.

Another object of the invention is the provision of a novel process for the decomposition of calcium acetate which is adapted to be performed in a manner enabling automatic cleaning and removal of the residues which are formed.

These and further objects and advantages of the present invention will become evident during the following description in which, in order to facilitate an understanding of the invention, reference is made to the accompanying drawing in which:

Fig. 6 is a side elevation, partly in section, and showing the production of acetone and by-products starting from calcium acetate liquor.

Figure 1:
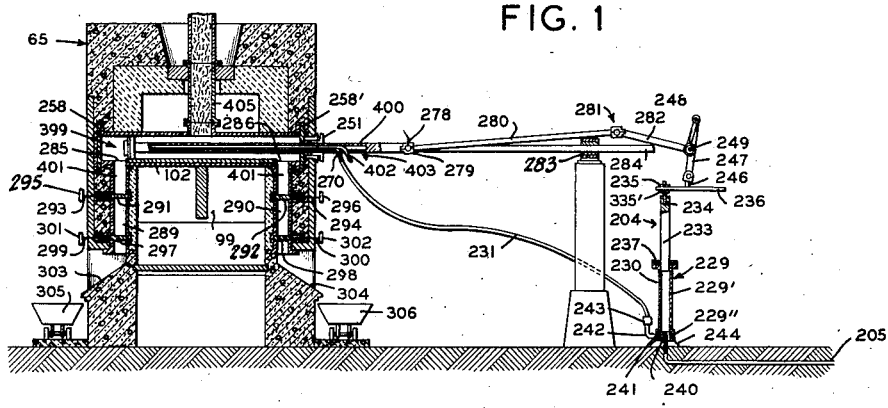
Fig. 1 is a longitudinal section of the calcium acetate decomposition cylinder and its accessories.
Figure 2:
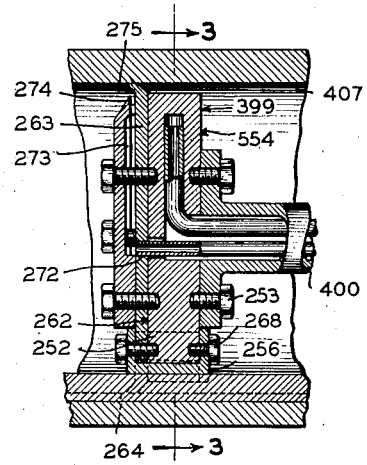
Fig. 2 is a longitudinal section of the piston and atomizing head of the calcium acetate decomposition cylinder.
Figure 3:
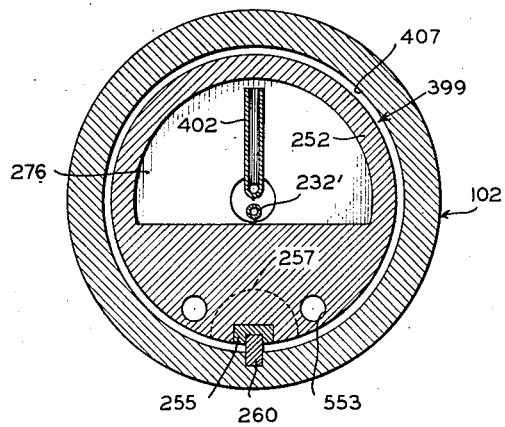
Fig. 3 is a cross-section along line 3—3 of Fig. 2.
Figure 4:
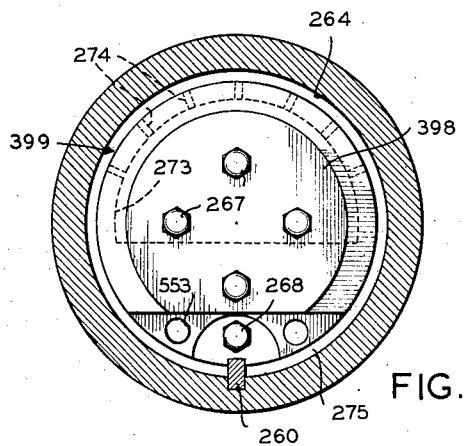
Fig. 4 is a front elevation of the piston and atomizing head.
Figure 5:
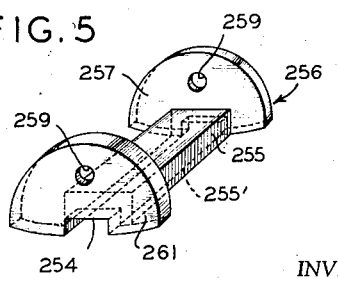
Fig. 5 is a perspective view of a wear guide of the piston.

The decomposition of calcium acetate liquor, in accordance with the invention, is illustrated in Figs. 1–5. Referring first to Fig. 1, liquor supply means 204 for the calcium acetate liquor comprises a pump 229 which is connected to supply pipe 205 and to a flexible conduit 231 connected to the feeding device in the calcium acetate decomposition cylinder 102. The pump 229 comprises a cylinder 229' within which is slidably mounted a plunger 233, the upper end of which is connected to a stem 234. The free end portion of said stem 234 is linked by means of nuts 235 and 235' to a cross-bar 236 and a stuffing box 237 seals the inside of pump 229 from the outside and enables the passage of plunger 233. The base 229" of pump 229 has a central bore provided at its inner end with a seat for a ball 240 arranged in a cage 241 forming a check valve. A duct 242 is connected to the base 229" of cylinder 229'. A check valve 243 links duct 242 with the flexible conduit 231.

The cylinder 229' is mounted on a base 244 through which pipe 205 passes. Said pipe 205 connects said pump 229 with a source of calcium acetate liquor.

The cross-bar 236 has in its middle portion a projection 246 to which a connecting rod 247 is coupled, the other end of which is coupled to a crank 248 driven by driving shaft 249. It will be understood that upon rotating the driving shaft 249 the cross-bar 236 rises and falls and with it plunger 233 which in its upward movements draws out a given volume of liquid through pipe 205 passing through check valve 240 which will be in the position shown in broken lines. During the admission stroke above described, check valve 243 stops the return of liquid contained in flexible conduit 231 and connected devices, back to the cylinder 229'.

During the return stroke or downward movement of plunger 233, the liquid in cylinder 229' will be ejected through duct 242 and check valve 243 into flexible conduit 231 and at the same time, check valve 240 will be closed.

The calcium acetate decomposition cylinder 102 is housed at least partially in the heating chamber 99 of the furnace 65 and a partially hollow stem 400 enters decomposing cylinder 102 through a stuffing box 251. The free end of stem 400, as may be seen better in Figure 2, housed in cylinder 102 is provided with a flange supporting a disk 252 (see also Figure 3) by means of bolts 253. The lower part of said disk 252 has in the embodiment shown a wear piece 256 (see Figure 5) which slides on a guiding rail 260 fixed to the bottom part of the cylinder 102 and the length of which is substantially equal to the distance between openings 285 and 286 and the object of which will be explained later on. The wear piece 256 is formed of a bar 255 provided with a slot 254 in its lower face 255' (see Figure 5). Said slot 254 is complementary to the rail 260. Said bar 255 is provided at each end with supporting projections 257 and 261, respectively, which are linked to the lower part of the disk 252 by means of a plurality of bolts 268 (see Figure 2) which pass through perforations 259.

The front face 262 of disk 252 is a supporting surface for a residues scraper 263 the free edge 264 of which is in scraping contact with the internal wall 407 of cylinder 102.

An atomizing head 398 (see also Figure 4) is also supported by the disk 252 by means of a plurality of bolts 267 which also pass through scraper 263 which is further fixed to the lower part of said disk 252 by bolts 268. At least one longitudinal perforation 553 connects the front face 262 with the back face 554 of piston 399.

The hollow stem portion 400 is provided with an opening 270 at a portion outside cylinder 102 and at a point which does not enter into said cylinder 102 even if piston 399 reaches the deadcenter corresponding to the forward extremity of its stroke. Piston 399 is formed of an assembly of elements shown in detail in Figure 2, most of which have already been described.

The flexible conduit 231 enters into the hollow portion of stem 400 through opening 270 through which also enters a refrigerating duct 402. The flexible conduit 231 is obviously replaced by a rigid conduit 232' in the portion inside stem 400. Said conduit 232' passes through scraper 263 by a perforation 272 and enters a semicylindrical space 273 formed by the atomizing head 398 and the scraper 263. Said semicylindrical space 273 is provided at its periphery with a plurality of spaced nozzles 274 which enable the ejection of the calcium acetate liquor through said nozzles 274 by plunger 233 during its downward stroke, which liquor is ejected into the interior of cylinder 102 and more particularly on the internal wall 407. To this effect the inclined portion 275 of scraper 263 is a directing screen for the liquor ejected by the nozzles 274.

Said duct 402 enters a semicylindrical chamber 276 arranged in disk 252 and returns through said semicylindrical chamber 276, hollow stem 400, to leave said stem 400 through pipe 403. The rear portion of stem 400 behind opening 270 is preferably solid and supports a cross-pin 278 partially housed in bearing 279 integral with one end of connecting rod 280, the other end of which forms a link 281 with a crank 282 driven by driving shaft 249. A supporting and sliding guide 283 for stem 400 is provided between the free outer end 284 of the stem 400 and the cross-pin 278.

The weight of piston 399 is considerable and it is preferred to provide the cylinder 102 with a rail 260 and a wear piece 256 for the piston 399 whereby, when the wear piece 256 and more particularly the bar 255 thereof becomes worn, the wear piece 256 may be easily replaced without it being necessary to rebore the cylinder 102.

As may be best seen in Figure 1, cylinder 102 projects out of heating chamber 99 at both ends, which are closed by cover plates 258 and 258'. Each of said projecting parts have in their bottom sections, openings 285 and 286 to which sinks 401 are connected, having corresponding antechambers 289 and 290, separated by panels 291 and 292, operable by means of screws 293 and 294, provided with hand wheels 295 and 296, respectively. The antechambers 289 and 290 are isolated from the outside by means of discharge panels 297 and 298 operable by means of screws 299 and 300 provided with hand wheels 301 and 302, respectively.

The sinks 401 collect residues which are discharged by piston 399 and when said sinks 401 are full with residues the said residues are passed to the antechambers 289 and 290 by operating hand wheels 295 and 296, respectively; once said residues have been discharged into the respective antechambers the panels 291 and 292 are closed again and the discharge panels 297 and 298 are opened, whereby said residues are discharged through channels 303 and 304 into carriages 305 and 306 forming preferably part of a train (not shown).

As will be understood, upon discharging the residues in the manner above explained, there is no connection established between the inside of cylinder 102 and the atmosphere so that loss of acetone and other decomposition products is avoided.

Having thus explained the structural details of the last devices described which are the pump 204, the calcium acetate decomposition cylinder 102 and their respective accessories, the operation thereof will now the analyzed.

In view of the fact that driving shaft 249 operates both pump 204 as well as piston 399, it is understood that the two mechanisms are synchronized. The synchronization is so conceived that when plunger 233 has reached the upper dead end of its stroke, piston 399 has reached the forward dead end of its stroke which in other words corresponds to the edge of opening 285. As the driving shaft 249 continues to rotate, plunger 233 will force the liquor contained in cylinder 229' through duct 242, check valve 243, flexible conduit 231, rigid conduit 232' and the nozzles 274, which eject the liquor in form of a finely divided spray onto the inner wall 407 of cylinder 102; the arrangement being such that the ejection is carried out during the movement of the piston 399 from opening 285 towards opening 286. When piston 399 is fully retracted, it is adjacent the opening 286 and the ejection of liquor ceases when the piston has reached this position which corresponds to the lower projected end of the stroke of plunger 233 of pump 205.

Ejection of calcium acetate liquor does not take place during the opposite stroke of piston 399, because during said opposite stroke the plunger 233 draws in a new charge of liquor from supply pipe 205. Piston 399 and more particularly scraper 263 carries out in said opposite stroke a scraping action on the internal surface 407 of cylinder 102, discharging the residues through the opening 285 into sink 401.

In the following description, the stroke which piston 399 carries out from opening 285 towards opening 286 during which stroke it ejects liquor, will be called "the working stroke" and the other stroke will be called "the scraping stroke."

During the working stroke, piston 399 and more particularly nozzles 274 eject a finely divided spray of liquor onto the internal surface 407 of cylinder 102. In view of the fact that the internal surface 407 of cylinder 102 is at a high temperature when the liquor spray contacts the internal surface 407, it is immediately dried and decomposed. A portion of the liquor spray does not adhere to the portion of the surface 407 toward which the spray was projected and falls onto the lower semicylindrical portion of cylinder 102. This happens because part of the liquor spray when ejected upwardly by nozzles 274 is repelled due to difference of surface tension between the liquor and the inner hot wall 407. Precisely due to that fact the nozzles 274 are only directed at the upper semicylindrical portion of wall 407 and the lower portion of wall 407 is indirectly coated. Thus, the ejection of liquor produced by nozzles 274 forms a thin film on the inner wall 407 during the working stroke. The gases which are produced during the cracking action leave cylinder 102 through exit duct 405 passing during the first half of the working stroke through the perforations 553 arranged in piston 399 and entering during the second half of the working stroke directly into said exit duct 405.

It is obvious that when the liquor contacts the hot inner surface 407 of cylinder 102 the temperature of the cylinder wall decreases. Once the working stroke is completed the piston starts its scraping stroke eliminating the residues which stick onto the inner surface 407, by scraping them off and during said scraping stroke the cylinder wall has sufficient time to increase its temperature to the correct calcium acetate decomposition temperature so that when a new working stroke is started the liquor which is ejected by nozzles 274 will contact an inner clean surface 407 which is at the correct decomposition temperature.

With reference to Fig. 6, the calcium acetate liquor passes through flexible duct 231 to the atomizing head 398 of piston 399 mounted on stem 400. The atomizing head 398 is slideably arranged in the calcium acetate decomposition cylinder 102, partially housed in heating chamber 99, as has already been described, and is provided at its respective ends with sinks 401, all of which has already been described.

A pipe 402 delivers the cooling liquid and a pipe 403 allows discharge of the heated cooling liquid. The cooling or refrigerating liquid is necessary in order to prevent the calcium acetate, which enters into stem 404, from forming incrustations on the internal walls of the duct 232' which is the continuation of the flexible duct 231, which incrustation would finally block said duct 232'.

The refrigerating liquid is water supplied by a source (not shown) and enters the stem as stated, through duct 402 and leaves the former through duct 403.

The calcium acetate decomposition cylinder 102 is provided at its upper middle part with an opening, to which an exit duct 405 extending into a dephlegmator 406, is provided. During the working stroke of piston 399, the atomizing head 398 projects a finely divided spray of calcium acetate liquor against the internal wall 407 of the calcium acetate decomposition cylinder 102. The finely divided spray forms a film on the internal wall 407, where the water is almost instantaneously evaporated and thereafter immediately the drying action of the paste starts, whereupon the dry paste decomposes, at which state the calcium acetate has reached a temperature exceeding 300° C.

Thus steam, acetone, methylacetone and acetone oil vapors are produced which leave the calcium acetate decomposition cylinder 102 through opening 404 and enter the dephlegmator 406. The residual ashes are discharged into sinks 401. It will be understood that the absence of a scraper piston in exit duct 405 of the calcium acetone decomposition equipment, makes it unnecessary to employ a sink 401 adjacent the end point of the working stroke of piston 399 or, in other words, the right hand sink in Figure 6. However, it is preferred to provide such a sink, because in practice it is possible that some small remaining residues are not discharged at the left hand sink during the scraping stroke or that some residues fall into the cylinder through opening 404, which are then discharged into the right hand sink.

By "acetone oils" are to be understood a mixture of substances obtained as by-products of the purification of the crude acetone, said by-products being derived from the higher ketones produced during the treatment of the calcium acetate liquid which has been formed from the pyroligneous acid which contain about 5% of acids other than acetic acid (see "La Industria de la Destilación de Leña y sus Derivados." Juan A. Yantorno, Buenos Aires, 1933, pages 546 ff.; 559 ff.).

The dephlegmator 406 collects the heavy oils and part of the water. The remaining gases and vapors rise into the concentration tower 408, formed of a plurality of cascade containers 409.

The uncondensed vapors and gases, which is a crude mixture of acetone at 20 to 25%, leave the tower through duct 410 and enter condenser 411, the object of which is to concentrate them even more, whereby a great portion of the water is returned to the concentration tower 408 through a reflux pipe 412, whilst the uncondensed gaseous products having a higher concentration of acetone, are discharged through discharge pipe 413 and enter refrigerator 414, wherein crude acetone is obtained, having a concentration of approximately 25 to 30%. This solution is discharged through pipe 415 into a dephlegmator 566, the upper part of which is connected through pipe 567 to a suction fan 568 connected to atmosphere, whilst the lower part of said dephlegmator 566 is connected to a discharge pipe 569 which leads the liquid to a precipitating deposit 416 where the acetone oils are separated and float on the surface of the acetone, so that they may pass, when a certain level has been reached, to tank 417, through pipe 418. The suction fan 568 is provided in order to decrease the pressure in the cylinder 102, concentration tower 408 and its accessories, so as to assure that the decomposed portion of calcium acetate in cylinder 102 is immediately withdrawn, whereby to avoid further decomposition of the crude acetone, as this is not desirable for the purpose herein pursued.

Refrigerator 414 and condenser 411 are cooled with water supplied from the water supply source (not shown) which water enters through admission pipe 419 into separator or refrigerator 414 and leaves the upper part thereof through pipe 420 to enter condenser 411 and is finally discharged at the upper part through discharge pipe 421.

It has now to be pointed out, that in order to remove all the traces of acetone from the water and acetone oil, which flow back to the dephlegmator 406, the latter is provided with heating coil 422, supplied with steam from the supply pipe 371. A valve 423 enables the volume of steam entering coil 422 to be controlled.

The aqueous acetone solution which settles out in tank 416 is ready to enter the acetone rectifying tower 424. A discharge pipe 425 provided with a control valve 426 is arranged in the lower part of tank 416 and permits discharge of the crude acetone. Once the crude acetone is conveniently re-heated it is conveyed through pipe 277 and enters the lower part of the acetone rectifying tower 424, in which the preheated crude acetone solution is subjected to a chemical treatment.

The acetone rectifying tower 424 comprises a bottom boiler 428 provided with a heating coil 429 which supplies steam through the main steam feeding pipe 371 said steam previously passing through valve 431. A discharge pipe 432 forms a level device for the boiler due to the fact that its discharge opening 432' is arranged at a certain height with regard to the floor to assure that the liquids which flow downwardly in tower 424 and enter into boiler 428, stay a considerable time in the boiler 428, the reason for which will be explained later on.

The acetone rectifying tower 424 is provided with a lower bubble container section 433 and an upper bubble container section 434. The upper section 434 is separated from the lower section of bubble containers 433 by an intermediate boiler 435 into which enter the upper part of the lower section of bubble containers 433.

A plurality of discharge ducts 436 connects the bottom section 434' of the upper section of bubble containers 434 with the lower part of the boiler 435, which discharge ducts 436 are adapted to discharge the liquid portions of the upper section of bubble containers 434 into said lower part of said boiler 435. A heating coil 437 is arranged in the bottom part of boiler 435 and is supplied with steam by the main steam feeding pipe 371. A discharge pipe 438 having a discharge opening 438' maintains the liquid level in the boiler 435 at a considerable height in a similar way as discharge opening 432' does with the liquid contained in boiler 428, whereby the liquid residues formed in boiler 435 may be discharged.

As has already been stated the crude preheated acetone enters through pipe 277 into the lower section of bubble containers 433 where the liquid portions will fall towards the boiler 428 and the gaseous products will rise in said tower 424. The heating coil 429 which is connected to the main steam feeding pipe 371 is provided with a discharge pipe 430 having a valve, and enables the temperature of the liquid portion housed in the boiler 428 to be raised, whereby the acetone vapors will be separated from said liquid and will rise in the tower 424 bubbling through the lower bubble container where the acetone content of the vapors is increased. These vapors will thus reach the containers 433' where they are treated with a corrective agent such as alkaline solutions supplied by auxiliary tank 439 and its supply pipe 440. A control valve 441 enables graduation of the volume of the alkaline solution, which may be for instance sodium carbonate, sodium hydrate or calcium hydrate. This alkaline solution (or solutions) is added in order to precipitate the remainder of the oils and neutralize the possible entrainments of phenols which are produced by remainders of tar which may have been present in the calcium acetate liquor.

The thus purified acetone vapors rise and bubble in the following bubble containers until they finally reach the boiler 435 to pass thereafter into the upper bubble container section 434.

In this upper section 434 the vapors bubble in the liquid part containing in solution a corrective agent such as mineral acids supplied by auxiliary tank 442 through valve 443 and pipe 444. The mineral acids are necessary for eliminating the amine portions and other impurities which the acetone vapors may still contain.

Thus the pure acetone vapors leave the upper part of tower 424 through pipe 445 and enter condenser 446 which returns to the acetone rectifying tower 424 through pipe 447 the liquid parts which may have been entrained, whilst the acetone vapors are led into refrigerator 448 through duct 449 and in the refrigerator 448 said acetone vapors are liquefied. The liquid acetone leaves said refrigerator 448 through discharge pipe 450 and enters storage tank 451 (only schematically illustrated) previously passing through a test tube 452 provided with a breather pipe 453.

The cooling system of the condenser 446 and the refrigerator 448 is exactly the same as that of condenser 411 and refrigerator 414 and therefore it will not be specifically described.

Meantime the liquid portion which enters boiler 435 through discharge duct 436 and which still contains acetone in solution, is retained a considerable time in said boiler 435 in order to remove any last traces of acetone which said liquid may contain to which effect the heating coil 437 is provided.

From the above explanation in connection with the acetone rectifying tower 424 it may be understood that in view of the double arrangement of boilers and accessories, loss of heat is considerably reduced as compared with known types of rectifying towers which use at least two independent columns, one for the alkaline treatment and the other for the acid treatment. If an equipment with two independent towers is used, no substantial modifications are necessary in the process.

Furthermore this novel tower 424 also enables the total height thereof to be reduced in comparison with the sum of the heights of the known independent towers which also signifies a reduction in the number of bubble containers.

In view of the foregoing statements it can also be understood that the rectifying tower 424 or its structural equivalent can be employed in connection with any other type of distilling process, wherein the fluid to be rectified must be subjected to two different treatments such as the acid and alkaline treatments above described. Obviously if the bubble containers have to be replaced by any other type of container, such as cascade containers previously described, this can easily be done. Therefore this invention intends to cover also this alternative.

The acetone oils part of which, as has already been described, is accumulated in the upper part of tank 417, are also acumulated in tank 454. The acetone oils which are collected in tank 454 are supplied by dephlegmator 406 through pipe 455 which operates according to the same principles of levels as discharge pipes 432 and 438. A discharge pipe 456 which also operates according to the same principle discharges the water contained in tank 454 which is run to waste. A pump 457 takes up from the upper part of tank 454 the acetone oils which float on the water in tank 454, by means of duct 458 and sends said acetone oils through duct 459 into tank 417.

A pump 460 provided with a suction duct 461 which enters tank 417 sends said acetone oils through supply duct 462 into boiler 463 of the acetone oil rectifying tower 464. This boiler 463 is provided with a heating coil 466 having steam discharge openings 467, which coil 466 is connected to the main steam feeding pipe 371 through valve 465.

The acetone oils which enter boiler 463 through valve 468 start to rise in gaseous form, in other words the acetone oil vapors and the water vapors pass through bubble containers (not shown), arranged in tower 464 where different products are separated at different heights; more particularly the heavy oils are collected in the lower part of tower 464 by pipe 469 passing through refrigerator 470 into storage tank 471. The medium oils are collected at a medium height of column 464 by means of pipe 472 passing refrigerator 473 and are stored in storage tank 474 and finally the light oils are collected in the upper part by duct 475 passing through refrigerator 476 and are stored in storage tank 477. All the storage tanks 471, 474 and 477 are schematically shown.

It is obvious that the separation of the different acetone oils must be made in accordance with the purpose for which they are intended. As an example it may be pointed out that these oils may be used as a denaturant for ethyl alcohol.

I claim:

1. In the method of decomposing calcium acetate liquor, the steps comprising providing an internal surface heated to the decomposition temperature of calcium acetate liquor, as a first step depositing a thin film of calcium acetate liquor upon said heated internal surface by spraying and first evaporating the water content of said calcium acetate liquor and forming a pasty material, and then decomposing the resulting dried product and forming a residue and a gaseous fraction comprising acetone and acetone oil vapors, during said first step progressively moving the locus of spray to continuously deposit new increments of the calcium acetate liquor on successive areas of said heated surface, progressively, as a second step, removing the solid residue produced by decomposing the calcium acetate liquor from said heated surface by scraping, there being no spraying action during said second step, and separately recovering from said gaseous fraction a crude acetone fraction and acetone oil fraction.

2. The method recited in claim 1 in which said heated internal surface is constituted by a horizontally positioned generally cylindrical member and said spray is directed substantially only toward the upper portion of said cylindrical surface.

3. In the method of decomposing calcium acetate liquor, the steps comprising as a first step, spraying a thin film of calcium acetate liquor against the internal surface of a decomposition cylinder heated to the decomposing temperature of the calcium acetate liquor and first evaporating the water content of said calcium acetate liquor and forming a pasty material and then decomposing the resulting dried product and producing a residue and a gaseous fraction comprising acetone and acetone oil vapors, during said first step progressively moving the locus of spray to continuously spray new increments of the calcium acetate liquor on successive surface areas heated to the decomposition temperature of the calcium acetate liquor, progressively, as a second step, removing from said heated surface, by scraping, the solid residue produced by decomposing the calcium acetate liquor, there being no spraying action during said second step, and separately recovering from said gaseous fraction a crue acetone fraction and an acetone oil fraction.

4. In the method of decomposing calcium acetate liquor, the steps comprising as a first step spraying a thin film of calcium acetate liquor against the internal surface of a decomposition cylinder heated to the decomposing temperature of the calcium acetate liquor and first evaporating the water content of said calcium acetate liquor and forming a pasty material and then decomposing the resulting dried product and producing a residue and a gaseous fraction comprising acetone and acetone oil vapors, said decomposition cylinder being under a suction to insure that the gaseous decomposition products of the decomposed calcium acetate liquor are quickly withdrawn from said cylinder to thereby avoid decomposition of crude acetone products during the decomposition step, progressively moving during said first step the locus of spray to continuous spray new increments of calcium acetate liquor on successive surface areas heated to the decomposition temperature of the calcium acetate liquor, progressively as a second step, removing from said cylinder, by scraping any solid residue produced by decomposing the calcium acetate liquor, there being no spraying action during said second step, and separately recovering from said gaseous fraction a crude acetone fraction and an acetone oil fraction.

5. In the method of decomposing calcium acetate liquor, the steps comprising, as a first step, spraying a thin film of calcium acetate liquor against the internal surface of a decomposition cylinder heated to the decomposing temperature of the calcium acetate liquor and first evaporating the water content of said calcium acetate liquor and forming a pasty material and then decomposing the resulting dried product and producing a residue and a gaseous fraction comprising acetone and acetone oil vapors, progressively moving during said first step the locus of spray to continuously spray new increments of the calcium acetate liquor on successive surface areas heated to the decomposition temperature of the calcium acetate liquor, progressively, as a second step, removing from said heated surface, by scraping the solid residue produced by decomposing the calcium acetate liquor, there being no spraying during said second step, fractionating said gaseous fraction containing acetone and acetone oils and producing heavy liquid acetone oils in admixture with water, and a lighter gaseous second fraction containing acetone, lighter acetone oils and the remainder of the evaporated water, condensing said second fraction to produce a mixture of a crude acetone product of high acetone-content and water, and a gaseous uncondensed mixture having a higher concentration of acetone than the condensed product; and recovering the crude acetone.

6. The process of decomposing calcium acetate liquor, comprising, as a first step, spraying a thin film of calcium acetate liquor containing water against the internal surface of a decomposition cylinder and first evaporating the water-content of the calcium acetate liquor and forming a pasty material and then decomposing the resulting dried product and producing a residue and a gaseous product comprising acetone and acetone oil vapors, progressively moving during said first step the locus of spray to continually spray new increments of the calcium acetate liquor on successive surface areas of the cylinder heated to the decomposition temperature of the calcium acetate liquor, progressively, as a second step, removing from said heated surface, by scraping, the solid residue produced by decomposing the calcium acetate liquor, there being no spraying action during said second step, concentrating and condensing said gaseous product containing acetone oil vapors and obtaining a condensate comprising crude acetone and acetone oils, settling said concentrate whereby there is formed a supernatant layer comprising substantially acetate oils and a lower layer comprising substantially crude acetone together with some retained acetone oils, entrained phenols, and impurities including amines, collecting the acetone oils, heating said lower layer and converting the same into a vapor phase product, treating the latter with at least one alkaline solution and precipitating said retained acetone oil fraction and neutralizing the entrained phenols, treating the purified neutralized lower layer while in a vapor, first, with an acid solution to thereby remove said amines and provide substantially pure acetone vapor, concentrating, refrigerating and collecting said substantially pure acetone, and separately purifying and collecting said acetone oils.

References Cited in the file of this patent

UNITED STATES PATENTS

| | | |
|---|---|---|
| 385,777 | Rumpf | July 10, 1888 |
| 393,079 | Rumpf | Nov. 20, 1888 |
| 648,389 | Chute | May 1, 1900 |
| 1,542,538 | Wilkie | June 16, 1925 |
| 1,548,307 | Giger | Aug. 4, 1925 |
| 1,862,028 | Lovett | June 7, 1932 |
| 2,177,557 | Bergstrom | Oct. 24, 1939 |
| 2,597,497 | Joris | May 20, 1952 |
| 2,621,150 | Mora | Dec. 9, 1952 |